Jan. 5, 1954

W. H. PHELPS 2,664,685

ADJUSTABLE FRAME POWER MOWER

Filed May 20, 1950

2 Sheets-Sheet 1

Inventor:
William H. Phelps
By
Schroeder, Merriam, Hofgren & Brady
Attorneys

Jan. 5, 1954 W. H. PHELPS 2,664,685
ADJUSTABLE FRAME POWER MOWER
Filed May 20, 1950 2 Sheets-Sheet 2
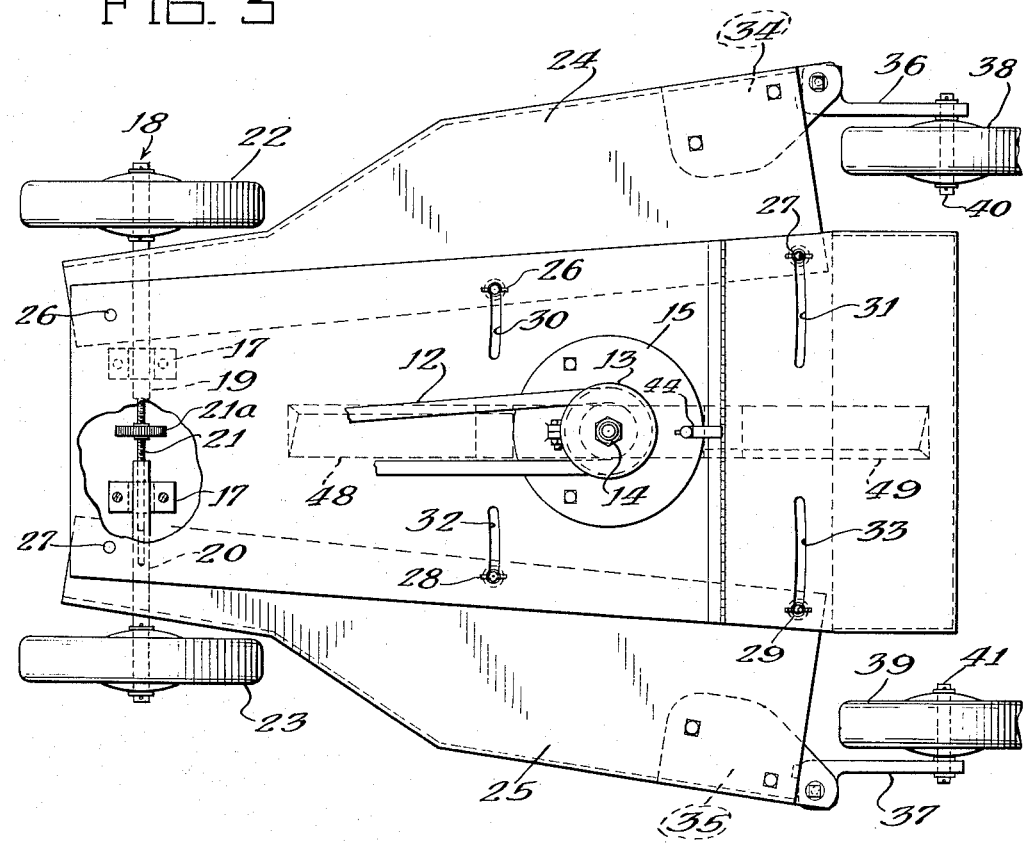
FIG. 3
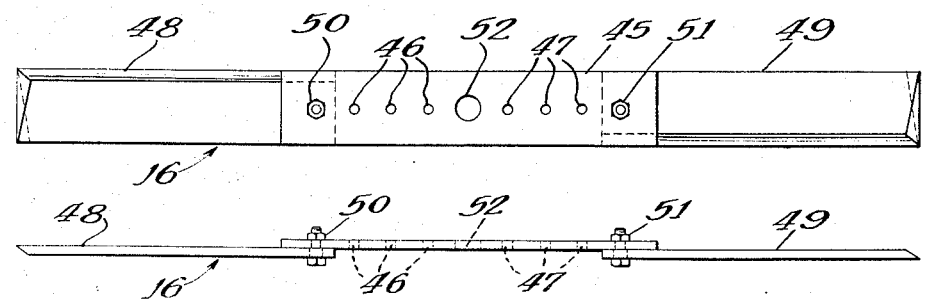
FIG. 4
FIG. 5
Inventor:
William H. Phelps
By
Schroeder, Merriam, Hofgren & Brady
Attorneys

Patented Jan. 5, 1954

2,664,685

UNITED STATES PATENT OFFICE 2,664,685

ADJUSTABLE FRAME POWER MOWER

William Howard Phelps, Ralston, Nebr.

Application May 20, 1950, Serial No. 163,148

4 Claims. (Cl. 56—25.4)

This invention relates to a power mower, and in particular to a frame for a power mower which is laterally expansible in order that the mower may accommodate cutter blades of various sizes.

Power mowers of the type in which the cutting is performed by a horizontally rotating blade suspended beneath a platform are customarily manufactured in several different sizes for different operating conditions. This has necessitated dies, jigs and molds for frames of various sizes, and no single mower has been convertible from one blade size to another.

This invention provides a mower platform which is laterally expansible, or extendible, so that a single set of frame members may be assembled in different relationships to one another to permit the manufacturer to produce a normal line of different sized mowers with a single set of dies, molds, and so forth. Furthermore, by providing an extensible blade, it is possible for the individual owner of a power mower to adjust the cut of his own mowing machine to accommodate it to varying conditions.

The principal object of the invention is, therefore, to provide a power mower in which the mower frame is laterally expansible to accommodate mower blades of various lengths.

A further object is to provide such a mower in which the cutter blade is formed of a plurality of pieces so as to be adjustable to several different lengths.

Figure 1:
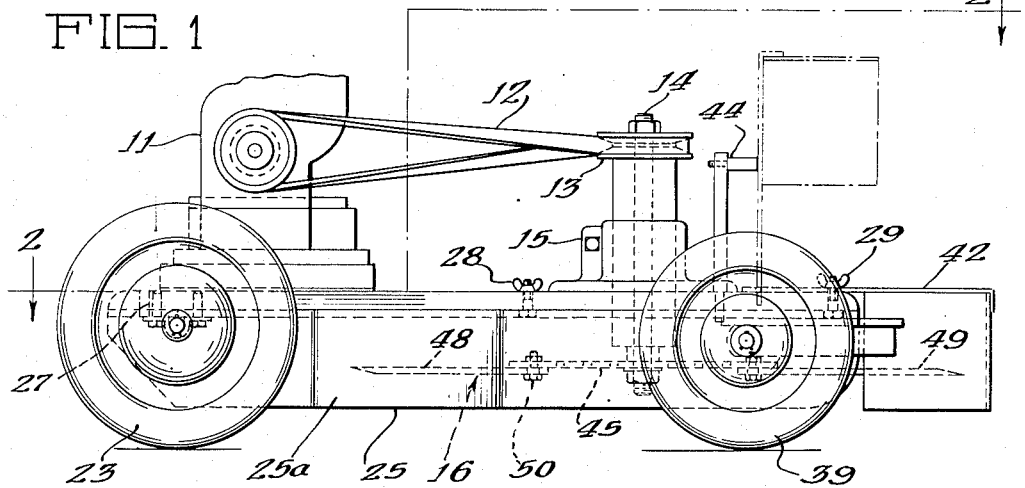
Figure 2:
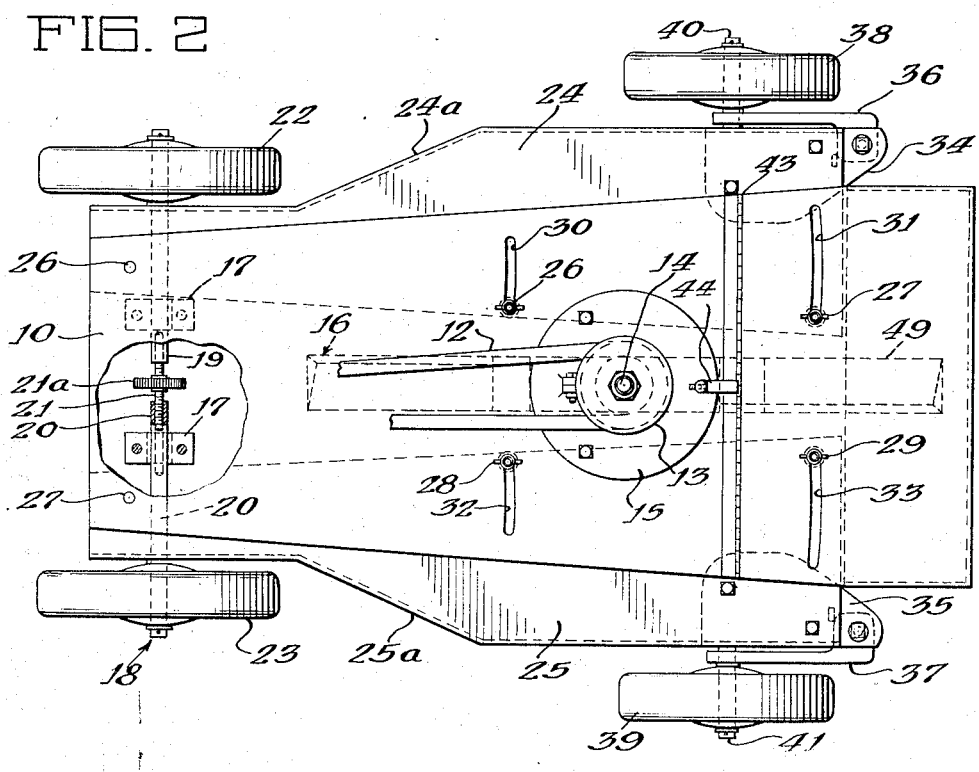

The invention is illustrated in a preferred embodiment in the accompanying drawings in which:

Fig. 1 is a side elevation of a mower constructed in accordance with the invention; Fig. 2 is a plan view, partially in section, taken as indicated along the line 2—2 of Fig. 1, with a rear portion of the frame broken away and the frame in its narrow adjusted position; Fig. 3 is a view similar to Fig. 2 but showing the frame in its most extended position, and the space between the rear wheels correspondingly increased; Fig. 4 is a plan view of an adjustable mower blade suitable for use with the adjustable frame; and Fig. 5 is a side elevational view of such a mower blade.

Referring to the drawings, in greater detail, the mower comprises a central frame member 10 which affords a platform for a motor 11 which is connected by a belt 12 to a pulley 13 at the top of an upright shaft 14 on a mower head 15 which is supported adjacent the forward portion of the central frame member 10. The shaft 14 extends below the central frame member 10 and has a mower blade 16 at its lower end.

The central frame member 10 has a pair of axle brackets 17 to receive an extensible rear axle indicated generally at 18. The rear axle comprises extension members 19 and 20 which are oppositely threaded to engage a connecting screw 21 by means of which the length of the axle may be varied so as to increase or decrease the span between rear wheels 22 and 23 which are mounted on the extension members 19 and 20. To facilitate adjustment of the axle a hand wheel 21a is preferably provided on the screw 21.

A pair of flanking frame members 24 and 25 are pivoted at the rear of the central frame member 10 on pivots 26 and 27, respectively; and the forward portions of the flanking frame members 24 and 25 have pins 26—27 and 28—29, respectively, which engage respectively with slots 30, 31, 32 and 33 on the central frame member 10 so as to guide the flanking frame members in various positions of adjustment. Preferably the front pins 27 and 29 are bolts, and are provided with nuts so that the flanking frame members may be releasably secured in any position of adjustment between the collapsed position of Fig. 2 and the extreme extended position of Fig. 3. The flanking frame members are provided with the usual guard skirts 24a and 25a.

At the front corner of each of the flanking members 24 and 25 are front wheel mounting plates 34 and 35 which are bolted to the flanking frame members and act as pivot supports for front wheel shifter arms 36 and 37. The front wheels 38 and 39 of the mower are journalled upon the stub-axles 40 and 41 of the shifter arms 36 and 37. By mounting the front wheels 38 and 39 upon shifter arms they may be brought into parallel alignment with the rear wheels 22 and 23 in any adjusted position of the flanking frame members 24 and 25. Furthermore, if desired the front wheels may be completely shifted to the forward position of Fig. 3, so as to permit use of the mower to cut close against lateral obstructions, such as walls.

A front guard 42 is mounted upon a pivot 43 so that it may be turned up to the retracted position shown in broken lines in Fig. 1; and a latch 44 is provided to detachably retain the guard 42 in the retracted position. This is to permit use of the mower to cut close to the trunks of trees, or even to cut down small trees which may be in the area to be mowed.

The adjustable frame arrangement disclosed above permits the mower manufacturer to produce a full line of mowers of different sizes from a single set of dies. However, if it is desired that a purchaser of the mower shall be able to change the size of the mower to fit varying conditions an adjustable mower blade may be provided, and this is illustrated in Figs. 4 and 5. It is understood however, that the mower may be provided with a standard mower blade, rather than the adjustable blade here illustrated. The preferred mower blade is formed of a mounting portion 45 provided with a series of adjustment apertures 46, and a similar set 47. The extensible members 48 and 49 of the mower blade may be assembled with the mounting portion 45 by attachment with bolts 50 and 51 respectively, which may be selectively placed through any of the apertures 46 and 47 in order to vary the length of the mower blade. The assembly portion 45, is of course, provided with a central opening 51 by which it is fastened on the mower shaft 14.

The foregoing detailed description is given for clearness of understanding only, and no unnecessary limitations should be understood therefrom, for some modifications will be obvious to those skilled in the art.

I claim:

1. A power mower having a laterally expansible frame, comprising: a central frame member having a substantially solid top plate; a pair of rear wheels journaled on said central frame member; an upright mower head supported on the central frame member and having a shaft extending through the frame provided with a horizontal mower blade which is free to rotate below the central frame member; a pair of flanking frame members each of which has a solid top plate and a depending skirt along its outer margin which extends below the level of said mower blade, said flanking frame members being mounted so that their forward portions may be laterally adjusted with respect to the central frame member; a front wheel at the forward corner of each flanking frame member; and means for adjustably securing the forward portions of the flanking frame members to the central frame member so as to vary the span between said skirts.

2. A power mower having a laterally expansible frame, comprising: a central frame member having a substantially solid top plate; a pair of rear wheels journaled on said central frame member; an upright mower head supported on the central frame member and having a shaft extending through the frame provided with a horizontal mower blade which is free to rotate below the central frame member; a pair of flanking frame members which have substantially solid top plates and skirts along their outer margins extending below the level of said mower blade, said flanking frame members being pivotally secured to said central frame member at their rear ends whereby the span of said frame between said skirts may be adjusted to accommodate mower blades of several lengths; means for adjustably securing the forward ends of said flanking frame members to the central frame member; front wheels mounted on shifter arms at the front corners of said flanking frame members, said shifter arms being pivotally mounted to permit alignment of said front wheels parallel to the rear wheels in any adjusted position of the flanking frame members; and means for locking said shifter arms in any desired adjusted position.

3. The device of claim 2 in which the rear wheels are mounted on an axle which is extensible to adjust the span between said wheels.

4. A power mower as specified in claim 2 in which the mower blade is formed of a plurality of pieces which may be secured firmly together with any of several predetermined degrees of overlap so as to permit adjustment of the length thereof.

WILLIAM HOWARD PHELPS.

References Cited in the file of this patent

UNITED STATES PATENTS

| Number | Name | Date |
| --- | --- | --- |
| 1,302,489 | Hollis | Apr. 29, 1919 |
| 2,165,551 | Iverson | July 11, 1939 |
| 2,528,277 | Humes | Oct. 31, 1950 |
| 2,529,797 | Cauble | Nov. 14, 1950 |
| 2,559,897 | Phelps | July 10, 1951 |

FOREIGN PATENTS

| Number | Country | Date |
| --- | --- | --- |
| 719,071 | France | Feb. 1, 1932 |
| 884,069 | France | Apr. 12, 1943 |